United States Patent [19]

Tanaka et al.

[11] Patent Number: 4,857,617

[45] Date of Patent: Aug. 15, 1989

[54] PROCESS FOR PRODUCING A HIGH SOFTENING POINT HYDROCARBON RESIN

[75] Inventors: Koji Tanaka, Yokkaichi; Katsuo Takemoto, Aichi; Yasushi Sakai, Yokkaichi, all of Japan

[73] Assignee: Tosoh Corporation, Shin-nanyo, Japan

[21] Appl. No.: 225,786

[22] Filed: Jul. 29, 1988

[30] Foreign Application Priority Data

Jul. 30, 1987 [JP] Japan ............................... 62-188876

[51] Int. Cl.$^4$ ........................ C08F 4/14; C08F 236/20
[52] U.S. Cl. .................................... 526/237; 526/283; 526/290
[58] Field of Search .................. 526/76, 283, 290, 237

[56] References Cited

U.S. PATENT DOCUMENTS 3,299,170  1/1967  Gonzenbach ................... 526/237 X
3,468,837  9/1969  Wheeler ........................ 528/502 X

FOREIGN PATENT DOCUMENTS 0737231  9/1955  United Kingdom ............... 526/308

*Primary Examiner*—Joseph L. Schofer
*Assistant Examiner*—F. M. Teskin
*Attorney, Agent, or Firm*—Oblon, Spivak, McClelland, Maier & Neustadt

[57] ABSTRACT

A process for producing a high softening point hydrocarbon resin, which comprises polymerizing (a) an oil fraction having a boiling point within a range of from 140° to 220° C. selected among cracked oil fractions obtained by thermal cracking of petroleum and (b) a turpentine oil in the presence of a cationic polymerization catalyst, wherein the oil fraction (a) is adjusted to have a conjugated diolefin content of at most 1.5% by weight and a dicyclopentadiene (non-conjugated diolefin) content of from 7 to 17% by weight, the turpentine oil (b) is selected from the group consising of α-pinene, β-pinene, dipentene and mixtures thereof and used in an amount of from 5 to 15% by weight, the cationic polymerization catalyst is at least one member selected from the group consisting of boron trifluoride, aluminum trichloride and complexes thereof, and the polymerization is conducted at a temperature of from 0° to 70° C.

3 Claims, No Drawings

PROCESS FOR PRODUCING A HIGH SOFTENING POINT HYDROCARBON RESIN

BACKGROUND OF THE INVENTION

1. Field of the Invention

The present invention relates to a process for producing a hydrocarbon resin having a high softening point of from 130° to 140° C. and excellent solubility in a hydrocarbon solvent containing no aromatic component useful for printing ink or the like.

2. Discussion of Background

Aromatic hydrocarbons such as toluene and xylene have been commonly employed as solvents for printing ink for such reasons that they are inexpensive and provide excellent solubility, and they have narrow boiling point ranges so that the evaporation can readily be adjusted.

However, aromatic hydrocarbon solvents are per se harmful to human bodies and can be dangerous when they are dissipated in the atomsphere. Therefore, in recent years, there have been various restrictions or controls against their discharge or against their use. As a measure to cope with this problem, turning to relatively safe non-aromatic solvents has been desired, and this trend is also true for solvents for coating materials.

Aliphatic hydrocarbon resins and terpene resins having good solubility in non-aromatic solvents are hardly obtainable as resins having a high softening point of at least 130° C.

Conventional aromatic hydrocarbon resins having a softening point of at least 130° C. are inferior in the solubility because of their polarity. For example, the resins proposed in Japanese Examined Patent Publication No. 32432/1973 are not necessarily adequate in the solubility since they use phenols.

SUMMARY OF THE INVENTION

The present inventors have conducted extensive research for a process for producing a hydrocarbon resin having a high softening point as well as excellent solubility in non-aromatic solvents which have recently been increasingly employed as solvents for printing ink and coating materials and as a result, have arrived at the present invention.

The present invention provides a process for producing a high softening point hydrocarbon resin, which comprises polymerizing (a) an oil fraction having a boiling point within a range of from 140° to 220° C. selected among cracked oil fractions obtained by thermal cracking of petroleum and (b) a turpentine oil in the presence of a cationic polymerization catalyst, wherein the oil fraction (a) is adjusted to have a conjugated diolefin content of at most 1.5% by weight and a dicyclopentadiene (non-conjugated diolefin) content of from 7 to 17% by weight, the turpentine oil (b) is selected from the group consisting of α-pinene, β-pinene, dipentene and mixtures thereof and used in an amount of from 5 to 15% by weight, the cationic polymerization catalystis at least one member selected from the group consisting of boron trifluoride, aluminum trichloride and complexes thereof, and the polymerization is conducted at a temperature of from 0° to 70° C. so that a resin having a softening point of from 130° to 140° C. is obtained.

DETAILED DESCRIPTION OF THE PREFERRED EMBODIMENTS

The feed oil used in the present invention comprises the oil fraction (a) and from 5 to 15% by weight of the turpentine oil (b). The oil fraction (a) is adjusted to contain not more than 1.5% by weight of a conjugated diolefin and from 7 to 17% by weight of dicyclopentadiene (hereinafter referred to simply as DCPD).

In the present invention, if the turpentine oil in the feed oil is less than 5% by weight, the resulting resin tends to have poor solubility. On the other hand, if it exceeds 15% by weight, the softening point of the resulting resin tends to be low. Likewise, if the DCPD in the cracked oil fraction (a) is less than 7% by weight, the solubility of the resulting resin tends to be poor. On the other hand, if it exceeds 17% by weight, the bromine value of the resulting resin tends to be high and the storage stability tends to be low, whereby the solubility will be poor in from 1 to 2 months in storage. The same is true also when the conjugated diene exceeds 1.5% by weight.

The polymerization reaction in the present invention may be conducted by a usual method by using the above mentioned catalyst. After completion of the polymerization reaction, the catalyst is deactivated by a usual method, for example, by adding water or an aqueous alkaline solution to the reaction product, then deashing is conducted by e.g. washing with water, and then unreacted hydrocarbon oils are stripped to obtain a resin.

Now, the present invention will be described in further detail with reference to Examples. However, it should be understood that the present invention is by no means restricted by such specific Examples.

In the following Examples and Comparative Examples, the hydrocarbon resins were evaluated by the following methods.

(1) Softening point: Measured by a ring and ball method in accordance with JIS K-2531.

(2) Color: 5 g of a hydrocarbon resin was dissolved in 5 g of toluene, and the color of the solution was compared with the Gardner standard colors and represented by a Gardner value. (ASTM D-1544)

(3) Bromine value: Measured in accordance with JIS K-2543.

(4) Solubility: 5 g of a hydrocarbon resin was dissolved in 5 g of a non-aromatic hydrocarbon solvent having the following properties at a temperature of from 30° to 80° C. After cooling the solution to 25° C., the same solvent was dropwise added at the same temperature, whereby the amount of the dropwise addition of the solvent required until the solution became turbid was represented by ml. At least 50 was evaluated as good solubility, and less than 50 was evaluated as poor solubility.

| Test items | Magie 47 | Magie 52 |
|---|---|---|
| Specific gravity 15/4° C. | 0.800 | 0.815 |
| Aniline point (°C.) | 85 | 92 |
| Fractional properties | | |
| Initial (°C.) | 240 | 277 |
| Final (°C.) | 274 | 310 |
| Aromatic components (%) | 0 | 0 |

Note: Magie 47 and Magie 52 are solvents manufactured by Magie Bros. Oil Co.

EXAMPLE 1

A cracked oil fractin having a boiling point range of from 140° to 220° C. was subjected to thermal decomposition of DCPD under pressure, followed by removal of low boiling fractions and high boiling fractions to obtain an oil fraction having the composition as identified in Table 1. To this oil fraction, 6.0% by weight of α-pinene was added to obtain a feed oil.

500 g of this feed oil was charged into a 2 liter separable flask and polymerized at 45° C. for 3 hours. As the catalyst, 7.5 g of a boron trifluoride-ethyl ether complex (concentration: 47%) was added to the reaction system over a period of 80 minutes after the initiation of the reaction. The polymerization was conducted under a dry nitrogen atmosphere.

After completion of the polymerization, 250 g of a 1 wt% sodium hydroxide aqueous solution and 250 g of xylene were added to the reaction solution for neutralization. Then, the aqueous phase was separated, and the oil phase was washed with the same amount of water. The oil phase thus obtained was heated to a temperature of from 210° to 220° C. while blowing nitrogen thereinto to strip unreacted oil. Various properties of the resin thus obtained were measured, and the results are shown in Table 1.

EXAMPLE 2

The operation was conducted in the same manner as in Example 1 except that the feed oil as identified in Table 1 was polymerized at 35° C. by using 2.5 g of a boron trifluoride-phenol complex (concentration: 30%). The physical properties of the resin thus obtained are shown in Table 1.

EXAMPLE 3

The operation was conducted in the same manner as in Example 1 except that the feed oil as identified in Table 1 was polymerized at 13° C. by using 5.0 g of a boron trifluoride-butyl alcohol complex (concentration: 30%). The physical properties of the resin thus obtaibed are shown in Table 1.

COMPARATIVE EXAMPLES 1 AND 2

The operations were conducted in the same manner as in Example 2 except that the feed oils as identified in Table 1 were polymerized at 40° C. The properties of the resins thus obtained are shown in Table 1.

COMPARATIVE EXAMPLE 3

The operation was conducted in the same manner as in Example 3 except that the feed oil as identified in Table 1 was polymerized at a temperature of 8° C. The physical properties of the resin thus obtained are shown in Table 1.

COMPARATIVE EXAMPLE 4

The operation was conducted in the same manner as in Example 1 except that the feed oil as identified in Table 1 was polymerized by changing the amount of the catalyst to 1% by weight. The physical properties of the resin thus obtained are shown in Table 1.

COMPARATIVE EXAMPLE 5

The operation was conducted in the same manner as in Comparative Example 4 except that the feed oil used was as identified in Table 1. The physical properties of the resin thus obtained are shown in Table 1.

TABLE 1

| | | | Examples | | |
|---|---|---|---|---|---|
| | | | 1 | 2 | 3 |
| Feed oil composition | Cracked oil[1] fraction (wt %) | Conjugated diolefin | 0.5 | 0.5 | 0.6 |
| | | Dicyclopentadiene | 12.4 | 12.4 | 7.5 |
| | | Aromatic unsaturated components | 43.1 | 43.1 | 35.5 |
| | Turpentine oil (wt %) | α-Pinene | 6.0 | — | — |
| | | Dipentene | — | 6.0 | 12.0 |
| Polymerization conditions | | Catalyst (type)[4] | A | B | C |
| | | Catalyst (wt %)[2] | 1.5 | 0.5 | 1.0 |
| | | Temperature (°C.) | 45 | 35 | 13 |
| Polymer yield (wt %) | | | 49 | 52 | 37 |
| Physical Properties of resin | | Softening point (°C.) | 134 | 132 | 132 |
| | | Color | 11 | 10 | 8 |
| | | Bromine value | 35 | 31 | 34 |
| | | Solubility (ml) Magie 47 | At least 50 | At least 50 | At least 50 |
| | | Magie 52 | At least 50 | At least 50 | At least 50 |

| | | | Comparative Examples | | | | |
|---|---|---|---|---|---|---|---|
| | | | 1 | 2 | 3 | 4 | 5 |
| Feed oil composition | Cracked oil[1] fraction (wt %) | Conjugated diolefin | 0.5 | 0.3 | 0.6 | 0.3 | 1.6 |
| | | Dicyclopentadiene | 13.0 | 2.0 | 7.5 | 18.0 | 11.4 |
| | | Aromatic unsaturated components | 42.0 | 55.0 | 33.5 | 43.0 | 45.4 |
| | Turpentine oil (wt %) | α-Pinene | — | — | — | 8.0 | — |
| | | Dipentene | — | 7.0 | 17.0 | — | 6.0 |
| Polymerization conditions | | Catalyst (type)[4] | B | B | C | A | A |
| | | Catalyst (wt %)[2] | 0.5 | " | 1.0 | 1.0 | 1.0 |
| | | Temperature (°C.) | 40 | " | 8 | 45 | 45 |
| Polymer yield (wt %) | | | 54 | 60 | 41 | 42 | 47 |
| Physical Properties of resin | | Softening point (°C.) | 135 | 132 | 121 | 132 | 131 |
| | | Color | 9 | 9 | 7 | 11 | 9 |
| | | Bromine value | 34 | 26 | 37 | 45 | 37 |
| | | Solubility (ml) Magie 47 | 29 | 30 | At least 50 | 18[3] | 35[3] |
| | | Magie 52 | 10 | 9 | At least 50 | 8[3] | 15[3] |

TABLE 1-continued (1) Analyzed by gas chromatography
(2) % relative to the feed oil
(3) After storage for one month
(4) Types of catalyst
A: Boron trifluoride-ethyl ether
B: Boron trifluoride-phenol
C: Boron trifluoride-butyl alcohol As described in the foregoing, by restricting the composition of the feed oil, it is possible to obtain a resin having a high softening point of at least 130° C. and excellent solubility in a non-aromatic solvent.

What is claimed is:

1. A process for producing a high softening point hydrocarbon resin, which comprises polymerizing (a) an oil fraction having a boiling point within a range of from 140° to 220° C. selected from cracked oil fractions obtained by thermal cracking of petroleum and (b) a turpentine oil in the presence of a cationic polymerization catalyst, wherein the oil fraction (a) is adjusted to have a conjugated diolefin content of at most 1.5% by weight and a dicyclopentadiene content of from 7 to 17% by weight, the turpentine oil (b) is selected from the group consising of α-pinene, β-pinene, dipentene and mixtures thereof and used in an amount of from 5 to 15% by weight, the cationic polymerization catalyst is at least one member selected from the group consisting of boron trifluoride, aluminum trichloride and complexes thereof, and the polymerization is conducted at a temperature of from 0° to 70° C.

2. The process according to claim 1, wherein the turpentine oil (b) is α-pinene or dipentene.

3. The process according to claim 2, wherein the catalyst is a boron trifluoride-ethyl ether complex, a boron trifluoride-phenol complex or a boron trifluoride-butyl alcohol complex.

* * * * *